Feb. 4, 1964   P. J. SERLEMITSOS   3,120,637
COIL TESTING DEVICE EMPLOYING A D.C. BALANCE CIRCUIT
TO MEASURE THE EFFECT OF THE TEST COIL
LOADING ON A TRANSISTOR OSCILLATOR
Filed July 6, 1959
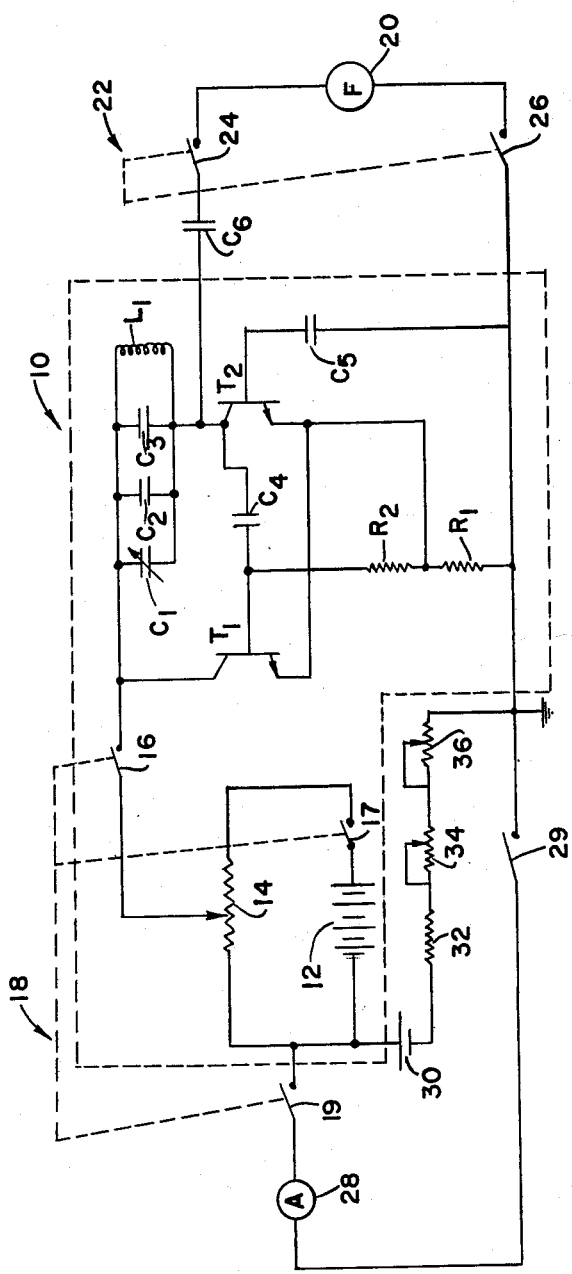
INVENTOR
Peter J. Serlemitsos
BY
Diggins & Le Blanc
ATTORNEYS

United States Patent Office

3,120,637
Patented Feb. 4, 1964

3,120,637
COIL TESTING DEVICE EMPLOYING A D.C. BALANCE CIRCUIT TO MEASURE THE EFFECT OF THE TEST COIL LOADING ON A TRANSISTOR OSCILLATOR
Peter J. Serlemitsos, Lancaster, Pa., assignor to The Hamilton Watch Company, Lancaster, Pa., a corporation of Pennsylvania
Filed July 6, 1959, Ser. No. 825,277
4 Claims. (Cl. 324—59)

This invention relates to a coil testing apparatus and in particular relates to an apparatus for testing miniature sized coils used in electric watches.

In the manufacture of electric watches of the type shown in assignee's copending application Serial No. 409,934, filed February 12, 1954, now Patents No. 2,888,797, it is customary to mount a very small coil on the balance wheel of the watch. As the balance wheel oscillates, the coil passes through a magnetic field and a contact mechanism connects the terminals of the coil to a battery to impart an impulse to the coil and thereby to the balance wheel to provide the driving energy for the watch. The accuracy of the watch is, in turn, related to the number of active turns in the coil.

Due to the very small size of the coils involved, a very considerable problem is involved in making the necessary electrical connections thereto. Because of the very small diameter of the wire used, it has been found that electrical connection to the wire ends is impractical because of excessive costs and high spoilage due to lost ends. The method which has been found most practical for establishing electrical connection to the coil involves baring a number of wires with a sharp instrument and attaching a connection bracket thereto by means of conductive paste. In this operation, however, a number of coil turns invariably become shorted to form a secondary winding. The actual number of shorted turns may vary from a few turns to several hundred thereby affecting the impedance of the coil and producing several different types of watch malfunction. Coils having an excessive number of shorted turns provide a reduced magnitude of oscillation for the balance wheel, reduced battery life and failure of the electrical contact system. It has been shown experimentally, for example, that coils exhibiting low impedance due to shorted turns affect the oscillation of the balance wheel by as much as one-quarter turn. For this reason, it has become imperative to be able to differentiate between acceptable coils and those which have an excessive number of turns shorted.

While there is commercially available equipment specially designed for counting coil turns, or for testing coils for shorted turns, this has been found completely inapplicable to watch coils due to their extremely small size. An attempt to discriminate between coils with different numbers of shorted turns by their resistance alone was unsuccessful due to the large variations in wire diameter which are encountered with the extremely small wire utilized in watch coils.

In one attempted solution to the problem, a two-transistor oscillator was developed having a constant frequency of oscillation and the output of the oscillator was applied across the coil to be tested. The losses caused in the coils by induced current were found to vary according to the number of turns shorted and this produced a voltage drop across the coils which varied in accordance with the size of the secondary winding. An oscilloscope was then utilized as an indicating device by connecting it across the coil to detect the variations in voltage drop for different coils. However, the variations were found to be too small for appreciable differentiation and, in addition, it was found extremely difficult to keep the oscilloscope properly adjusted, thereby necessitating frequent calibration. A further defect with this system is the relatively high cost of the equipment involved and the slow manner in which measurements can be obtained.

According to the present invention, it was discovered that this very small voltage variation across the load was accompanied by a variation in the D.C. input current of the transistor circuit. It was further found, however, that this variation did not depend entirely upon the output load but also upon the ambient temperature and the transistors employed. In spite of this, it was found that if the transistors are carefully balanced and the temperature of the surroundings stabilized, the input current changes are directly related to the changes in the output load and are of such a magnitude as to be usable. Thus, it becomes possible to isolate the desired variable for measurement. An important feature of the device of the invention is the use of a bucking or balancing circuit at the input of the oscillator so that the changes in input current may be accurately determined with inexpensive equipment at a maximum accuracy.

It is accordingly a primary object of the present invention to provide a device for testing electric watch coils using an oscillator circuit in a unique manner to measure the reactance of such coils.

It is a more specific object of the present invention to provide a device for testing electric watch coils using a transistorized oscillator circuit in a unique manner to measure the reactance of such coils.

It is still another object of the present invention to provide a coil testing apparatus using a balance circuit in the input thereof to enable a small change in impedance to be measured in the input circuit of a transistorized oscillator circuit.

These and further objects and advantages of the present invention will become more apparent upon reference to the following specification and claims and the appended single figure of drawing which presents a schematic representation of the coil testing apparatus of the present invention.

Referring to the drawing, the transistorized oscillator of the present invention is indicated generally at 10. A pair of transistors $T_1$ and $T_2$ are selected having identical input current versus output load characteristics and these have connected between the collectors thereof a tank circuit consisting of condensers $C_1$, $C_2$ and $C_3$ and inductance or choke $L_1$. Condenser $C_1$ is variable in order to provide for adjustment of the oscillator frequency.

The emitters of both transistors are connected together and to one end of a grounded resistor $R_1$. A second resistor $R_2$ is connected between the upper end of $R_1$ and the base of transistor $T_1$ to establish a forward bias condition for transistor $T_1$. A capacitor $C_4$ is connected between the collector of transistor $T_2$ and the base of transistor $T_1$ to form with the resistors $R_1$ and $R_2$ a phase shifting RC network to establish oscillation. The inductance or choke $L_1$ is preferably shielded to provide maximum frequency stability and all capacitors or condensers are preferably of the silvered mica type. Only a small amount of feedback is necessary in order to secure oscillation.

A condenser $C_5$ is connected between the base of transistor $T_2$ and ground to stabilize the base voltage of transistor $T_2$. The output of the oscillator is applied to the coil being tested through a capacitor $C_6$ connected to the collector of transistor $T_2$ and a coil fixture 20 is utilized to hold the coil under test. An output switch generally indicated at 22 and having contacts 24 and 26 is connected between the fixture and the output of the oscillator.

A battery 12 is connected by means of contact 17 across a potentiometer 14 and the variable contact on this potentiometer is connected via contact 16 to the collector of transistor $T_1$. The negative pole of the battery 12 is connected to a second battery 30 and thence through resistors 32, 34 and 36 to ground to complete the energizing circuit of the oscillator. The measuring circuit comprises a microammeter 28 connected to the battery 12 through contact 19 and to ground through a momentary switch 29. The contacts 16, 17 and 19 are commonly actuated to form the on-off switch for the unit.

Both a B+ and balancing voltage are applied to the oscillator through the closing of the on-off switch 18 and its contacts 16 and 17. It is desirable to operate the circuit in such an energized condition for at least one-half hour prior to actual testing in order to stabilize frequency and temperature. The setting of the movable contact on potentiometer 14 determines the magnitude of the voltage applied to the collector of the transistor $T_1$. A back bias is applied to the collector and base of transistor $T_1$ and a forward bias is applied between the emitter and base of transistor $T_1$ by the resistor biasing network $R_1$ and $R_2$. The frequency of oscillation is determined by the tank circuit $C_1$, $C_2$, $C_3$ and $L_1$ and may be varied by means of the variable capacitor $C_1$. Feedback is established through the RC network including $C_4$ and $R_1$ and $R_2$. The following is a list of typical component values used in the circuit:

| | |
|---|---|
| $R_1$ | 2K ohms. |
| $R_2$ | 300K ohms. |
| Potentiometer | 5K ohms |
| Fixed resistor 32 | 1.2K ohms. |
| Variable resistor 34 | .5K ohm. |
| Variable resistor 36 | 2.5K ohms. |
| $C_1$ | 100 micromicrofarads. |
| $C_2$ | 50 micromicrofarads. |
| $C_3$ | 900 micromicrofarads. |
| $C_4$ | 0.1 microfarad. |
| $C_5$ | 1.0 microfarad. |
| $C_6$ | 2500 micromicrofarads. |
| $L_1$ | 2.5 millihenries. |
| Microammeter 28 | 200 microamps. |
| Battery 12 | 6 volts. |
| Battery 30 | 1.5 volts. |
| Transistor $T_1$ | 2N35. |
| Transistor $T_2$ | 2N35. |

The apparatus must be temperature stabilized and this is most conveniently accomplished by maintaining it in an air-conditioned room with an average temperature of about 73° F. The apparatus is preferably grounded for stability. In the process of calibration, the on-off switch 18 is turned to the "on" position and the instrument allowed to warm up for at least one half hour. At this time no coil is placed in the coil holding fixture 20. After the warm-up period, the momentary switch 29 is closed and the reading of the meter 28 adjusted to zero by means of potentiometer 34. This potentiometer is intended as a fine adjustment with potentiometer 36 serving as a course adjustment, if necessary.

The output switch 22 is now closed to close contacts 24 and 26 and a standard coil of known reactance is inserted in the coil holding fixture. The momentary switch 29 is now closed and the number indicated on the meter 28 is recorded. If this number differs from the known value for this particular coil, controls 34 and 36 are adjusted to move the meter needle towards the correct position and past it by an amount equal to the difference between the known coil value and the previously recorded meter reading. As an example, if the value for the standard coil is 105 and the first reading was 100, the controls 34 and 36 are adjusted to move the meter reading past 105 to 110. The output switch 22 is thereupon opened and the meter reading is adjusted to zero through the use of potentiometer 14. It will be recognized, of course, that each time that a meter reading is desired, it is necessary to momentarily depress the momentary switch 29.

After this last adjustment, the output switch 22 is again closed with the standard coil in the fixture 20 and the momentary switch depressed to obtain a reading. If this reading is not the known value for the coil, the preceding adjustments are repeated until the meter indicates the known coil value. After this calibration, the instrument is ready for coil testing.

In coil testing, the on-off switch 18 is in the "on" position as is the output switch 22. A coil to be tested is mounted in the fixture 20 and the momentary switch 29 closed. If the meter 28 reads the same value as the standard coil previously used to calibrate the instrument, the coil being tested is acceptable. By calibrating the instrument with an acceptable coil, an unacceptable coil and a coil on the border line, it is possible to establish a meter reading below which coils are rejected and above which coils are accepted. Once this figure has been established, it is possible to test coils in an extremely rapid manner. It is advisable, however, to insert a standard coil in the fixture approximately every 10 to 20 coils tested in order to insure that the calibration of the instrument is remaining constant.

The importance of using a transistorized oscillator should be noted. The accurate measurement of a change in the D.C. supply current for the oscillator is possible because the supply current to the transistor oscillator is large enough to permit a change in output impedance to be sensed in the supply circuit. The novel bucking or balance circuit permits an extremely sensitive microammeter to be used for measuring currents of a magnitude which would ordinarily deflect the pointer off scale. The microammeter is further quite inexpensive when compared with an oscilloscope and is much easier to read and adjust.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A coil testing apparatus comprising a transistorized oscillator having a current supply circuit and an output circuit, and including a pair of matched transistors, said current supply circuit including a source of supply current, a coil to be tested, switching means adapted to connect said coil across said output circuit of said transistorized oscillator, a series connected balance circuit including a D.C. source of potential and a variable resistance coupled in said current supply circuit, a sensitive current indicating means connected across said balance circuit of said transistorized oscillator to indicate the reactance of said coil by virtue of a change in current flow through said current supply circuit, said balance circuit acting to balance the current in said current supply circuit of said transistorized oscillator so as to produce a reference reading on said sensitive current indicating means under a no-load condition.

2. A coil testing apparatus comprising a transistorized oscillator having a current supply circuit and an output circuit, and including a pair of matched transistors, said current supply circuit including a source of supply current, a coil to be tested, switching means adapted to connect said coil across said output circuit of said transistorized oscillator, a series connected balance circuit including a battery and a variable resistance coupled in said current supply circuit, a sensitive current indicating means connected across said balance circuit of said transistorized oscillator to indicate the reactance of said coil by virtue of a change in current flow through said current supply circuit, said balance circuit acting to balance the current in said current supply circuit of said transistorized oscillator so as to produce a reference reading on said sensitive current indicating means under a no-load condition, the closure of said switching means causing said sensitive current indicating means to indicate the reactance of said coil to be tested.

3. A coil-testing apparatus comprising a transistorized oscillator having a current supply circuit and an output circuit, and including a pair of matched transistors, said current supply circuit including a source of supply current, a coil to be tested, first switching means adapted to connect said coil across said output circuit of said transistorized oscillator, a series connected balance circuit including a battery and a variable resistance coupled in said current supply circuit, a sensitive current indicating means connected across said balance circuit of said transistorized oscillator to indicate the reactance of said coil by virtue of a change in current flow through said current supply circuit, said balance circuit acting to balance the current flow in said current supply circuit of said transistorized oscillator so as to produce a reference reading on said sensitive current indicating means under a no-load condition, and second switching means connected in series with said sensitive current indicating means so as to permit momentary readings of said sensitive current indicating means in establishing said reference reading.

4. A coil testing apparatus comprising: a transistorized oscillator having a current supply circuit including a source of supply current, and an output circuit; a pair of coil testing terminals connected across said output circuit through a first switch; said terminals being adapted to have a coil to be tested coupled thereacross so as to provide the output load impedance for said oscillator; a series connected balance circuit including a D.C. source of potential and a variable resistance; a current indicator coupled across said balance circuit through a second and third switch; said balance circuit being coupled in said current supply circuit by said second switch; the closure of said second switch causes said oscillator to be energized and provides a first current path including said balance circuit and said current supply circuit; the closure of said third switch provides a second current path including said indicator and said balance circuit whereby the varying of said variable resistance of said balance circuit permits a balancing of the current flow through said current supply circuit so that a reference reading on said indicator under a no-load condition may be determined; and the closure of said first switch couples said coil to be tested across said output circuit whereby said indicator is caused to indicate the reactance of said coil by virtue of a change in current flow through said current supply circuit.

References Cited in the file of this patent

UNITED STATES PATENTS

| | | |
|---|---|---|
| 2,847,625 | Popowsky | Aug. 12, 1958 |
| 2,893,651 | Singelman | July 7, 1959 |
| 2,924,774 | Maier | Feb. 9, 1960 |

OTHER REFERENCES

Radio and Television News; October 1953, pages 60–62, article by West.